(12) United States Patent
Novak et al.

(10) Patent No.: US 6,193,273 B1
(45) Date of Patent: Feb. 27, 2001

(54) AUTOMOTIVE VEHICLE CAST FRAME COMPONENTS

(75) Inventors: Miloslav Novak, Glenshaw, PA (US); Heinz Wenzel, di Fiorano (IT); John W. Cobes, Lower Burrell; Todd L. Summe, Pittsburgh, both of PA (US)

(73) Assignee: Aluminum Company of America, Pittsburgh, PA (US)

( * ) Notice: Subject to any disclaimer, the term of this patent is extended or adjusted under 35 U.S.C. 154(b) by 0 days.

(21) Appl. No.: 09/128,296

(22) Filed: Aug. 3, 1998

(51) Int. Cl.[7] .................................................. B62D 21/20
(52) U.S. Cl. ............................................................. 280/781
(58) Field of Search ........................... 280/124.146, 781, 280/784, 799; 296/192, 203

(56) References Cited

U.S. PATENT DOCUMENTS

| | | |
|---|---|---|
| 4,046,415 | 9/1977 | Klees et al. . |
| 4,386,792 * | 6/1983 | Moore et al. ........................ 280/781 |
| 4,466,653 | 8/1984 | Harasaki . |
| 4,613,184 | 9/1986 | Rispeter et al. . |
| 4,618,023 | 10/1986 | Norlin . |
| 4,804,222 | 2/1989 | Sakiyama et al. . |
| 4,840,424 | 6/1989 | Asoh . |
| 5,042,872 | 8/1991 | Yoshii . |
| 5,184,868 | 2/1993 | Nishiyama . |
| 5,201,566 | 4/1993 | Mori . |
| 5,316,367 | 5/1994 | Enning et al. . |
| 5,346,276 | 9/1994 | Enning et al. . |
| 5,350,214 | 9/1994 | Yamauchi et al. . |
| 5,364,128 | 11/1994 | Ide . |
| 5,480,189 * | 1/1996 | Davies et al. ........................ 280/797 |
| 5,496,067 * | 3/1996 | Stoll et al. ........................... 280/784 |
| 5,568,841 * | 10/1996 | Weissbach ........................... 180/311 |
| 5,894,908 * | 4/1999 | Eftefield ............................... 280/781 |
| 5,897,139 * | 4/1999 | Aloe et al. ........................... 280/781 |
| 5,921,578 * | 7/1999 | Sekita et al. ......................... 280/788 |

\* cited by examiner

*Primary Examiner*—Brian L. Johnson
*Assistant Examiner*—Tony Winner
(74) *Attorney, Agent, or Firm*—Brij K. Agarwal; Arnold B. Silverman; Thomas R. Trempus

(57) ABSTRACT

An automotive vehicle frame has a front frame portion, a rear frame portion and an intermediate frame portion connecting the front frame portion and the rear frame portion. The front frame portion has a pair of relatively spaced front strut towers and the rear frame portion has a pair of relatively spaced rear strut towers. Each of the front strut towers and each of the rear strut towers may have a plurality of frame components connected thereto. Portions of the vehicle suspension system may be secured to the front strut towers and the rear strut towers. The strut towers may have vehicle shock absorbers secured thereto. Numerous other vehicle components may be secured to the strut towers. The strut towers are unitary metal castings.

18 Claims, 9 Drawing Sheets

AUTOMOTIVE VEHICLE CAST FRAME COMPONENTS

BACKGROUND OF THE INVENTION

1. Field of the Invention

The present invention relates to an improved automotive vehicle frame construction which includes the use of pairs of front and rear unitary cast supports to which other portions of the frame and other portions of the vehicle are secured.

2. Description of the Prior Art

It has been known to provide automotive vehicles such as automobiles with various types of frame constructions established through the assembly of a large number of individual components. It has also been known to employ such frames not only to provide structural integrity to the vehicle, but also to secure other components such as steering, suspension, shock absorbing, and other elements of the vehicle thereto. See generally, U.S. Pat. Nos. 4,466,653, 4,804,222, 4,840,424, 5,316,367, 5,346,276, and 5,364,128.

One of the problems with prior known systems has been the need to inventory a large number of individual parts and to provide the labor required to assemble the same. In addition to such approaches being relatively expensive and, in many instances, increasing the weight of the vehicle, the need to effect appropriate alignment of the components has created problems. The need to maintain tolerances of the individual components has also created a problem.

It has been known to employ so-called "spaceframes" as frames for automotive vehicles so as to provide the desired structural integrity, strength, impact resistance and appropriate securement of the vehicle components which must be supported thereby.

In spite of foregoing known systems, there remains a very real and substantial need for an automotive vehicle frame which will provide enhanced efficiency of production while preserving or enhancing the desired or required qualities.

SUMMARY OF THE INVENTION

The present invention has met the above-described need by providing an automotive vehicle frame assembly which includes a front frame portion, a rear frame portion and an intermediate frame portion disposed intermediate the same connected thereto. The front frame portion has a pair of relatively spaced front strut towers and the rear frame portion has a plurality of relatively spaced rear strut towers. A plurality of frame components is connected to the strut towers which are disposed on the sides of the frame. Each of the strut towers is a unitary metal casting.

The strut towers are secured to the suspension means, but may be secured to and support the suspension means, the shock absorbers, steering components, structural cross members and other components of the system.

It is an object of the present invention to provide an improved substantially rigid automotive vehicle frame which will have frame portions which are unitary cast metal elements.

It is a further object of the present invention to provide such cast frame elements which are front and rear pairs of cast strut towers.

It is a further object of the present invention to provide such strut towers which will reduce frame assembly time and the cost of creating the frame.

A further object of the present invention is to provide such a system which facilitates use of spaceframe automotive vehicle frames.

It is yet another object of the invention to provide such a frame wherein the amount of joining of individual components to each other is minimized.

These and other objects of the invention will be more fully understood from the following description of the invention on reference to the illustrations appended hereto.

DESCRIPTION OF THE PREFERRED EMBODIMENTS

The term "unitary" as employed herein, shall refer to a single metal casting which may or may not have been subjected to machining or other processing after casting and shall also include such a casting which is made from the assembly of two individual cast components.

Figure 1:
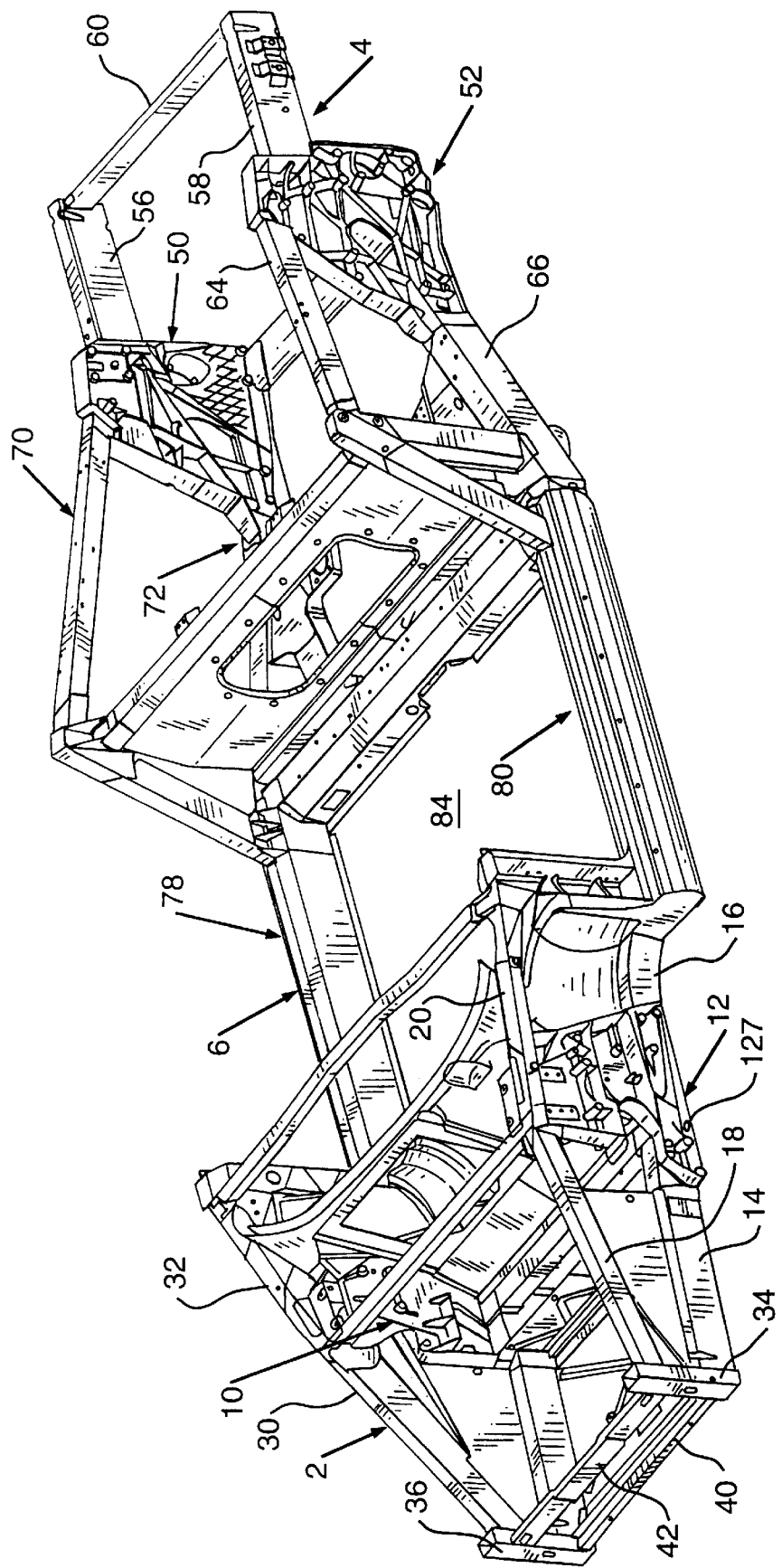
FIG. 1 is an isometric view of a form of the automotive vehicle frame of the present invention.

Referring to FIG. 1, there is shown a form of frame of the present invention. The frame has a front frame portion 2, a rear frame portion 4 and a connecting intermediate frame portion 6. The frame has the desired configuration, strength, impact resistance and other features required for it to cooperate with the numerous other components required to create a vehicle such as an automobile.

The front frame portion 2 has a pair of substantially rigid strut towers 10, 12 which are disposed on opposite sides of the frame and aligned with each other. As will be described herein in greater detail, a plurality of beams such as 14, 16, 18 and 20 are secured to front strut tower 12 with beams 14, 16 being secured to the lower portion thereof and 18, 20 being secured to the upper portion thereof. Similarly, beams 30, 32 and a pair of lower beams (not shown) are secured to front strut tower 10. The front frame portion 2 also has a pair of front posts 34, 36 which are connected by transverse structural beams 40, 42. The beams 14, 16, 18, 20, 30, 32 may be hollow extrusions.

The rear frame portion 4 has a pair of rear strut towers 50, 52 and a pair of rearwardly projecting beams 56, 58 which are connected by transverse beam 60. Beams 64, 58 and 66 are secured to rear strut tower 52 and beams 70, 56 and 72 are secured to rear strut tower 50. Beams 78 and 80 of the intermediate frame portion connect the front frame portion 2 with the rear frame portion 4 and serves to receive a suitable floor (not shown) in region 84. The frame, in the form shown, is designed for use with a rear engine vehicle and is a spaceframe.

Figure 2:
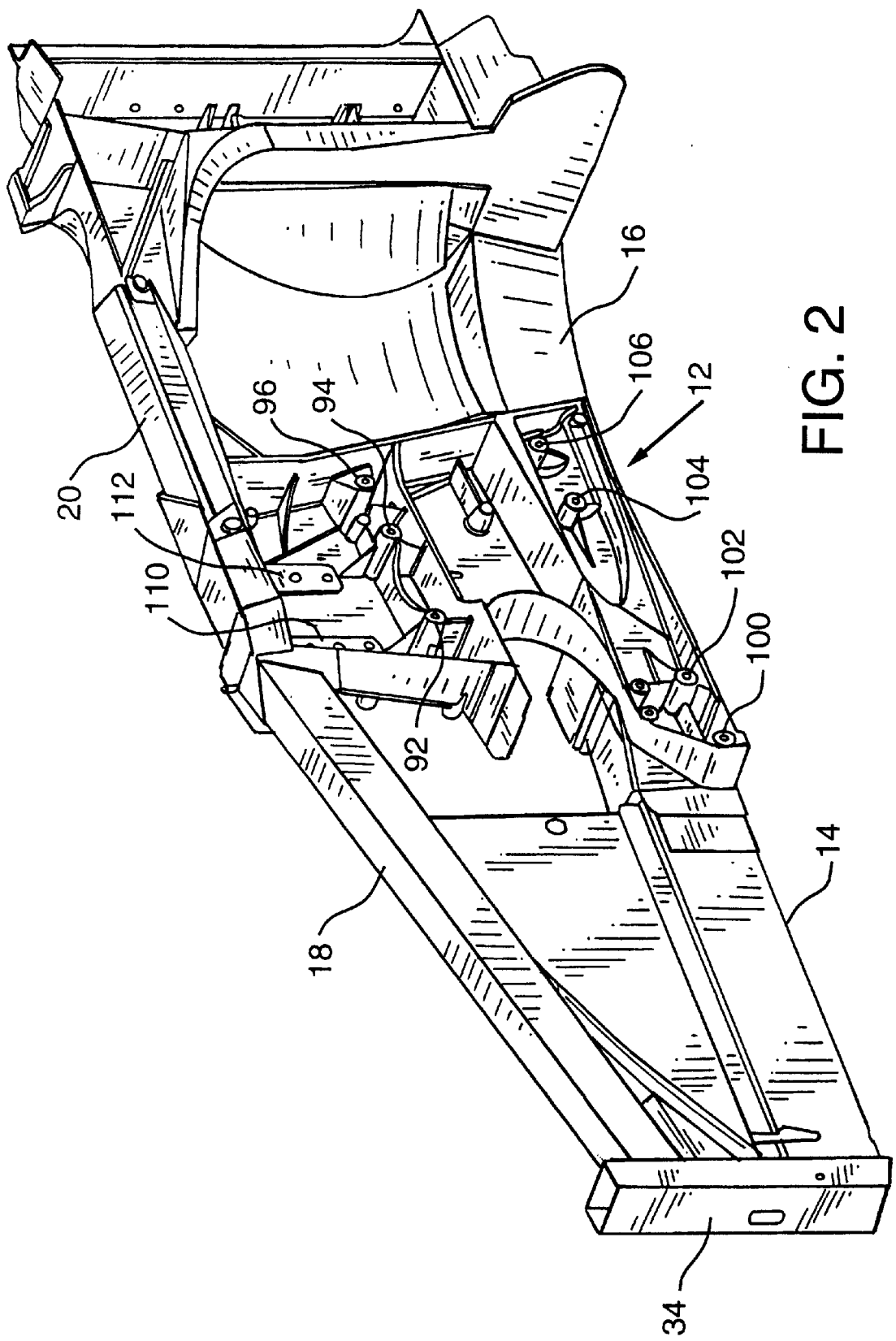
FIG. 2 is an isometric view of the left side of a front frame portion of the frame of FIG. 1.
Figure 3:
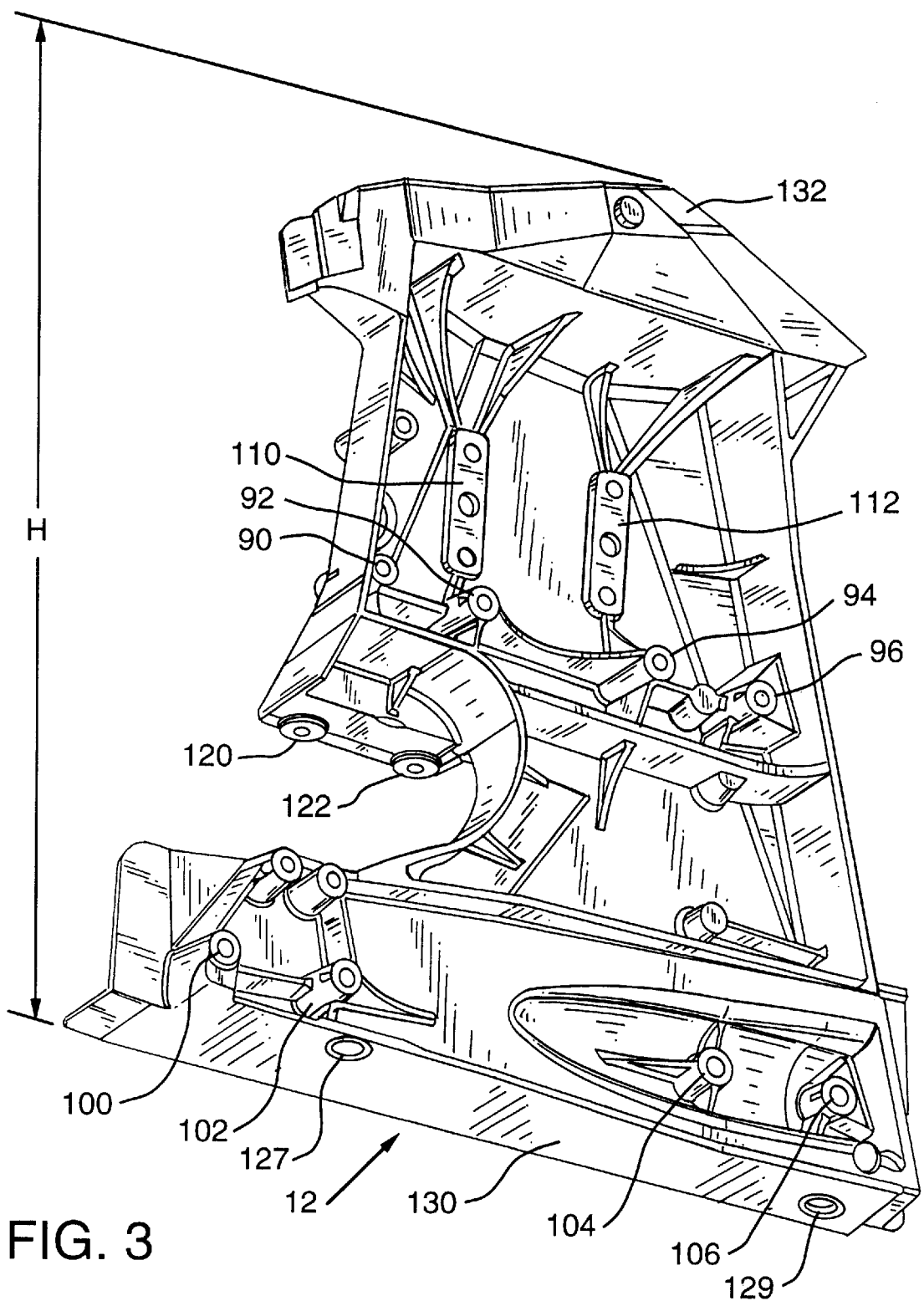
FIG. 3 is an isometric view of the strut tower of FIG. 2 showing the outside thereof.
Figure 4:
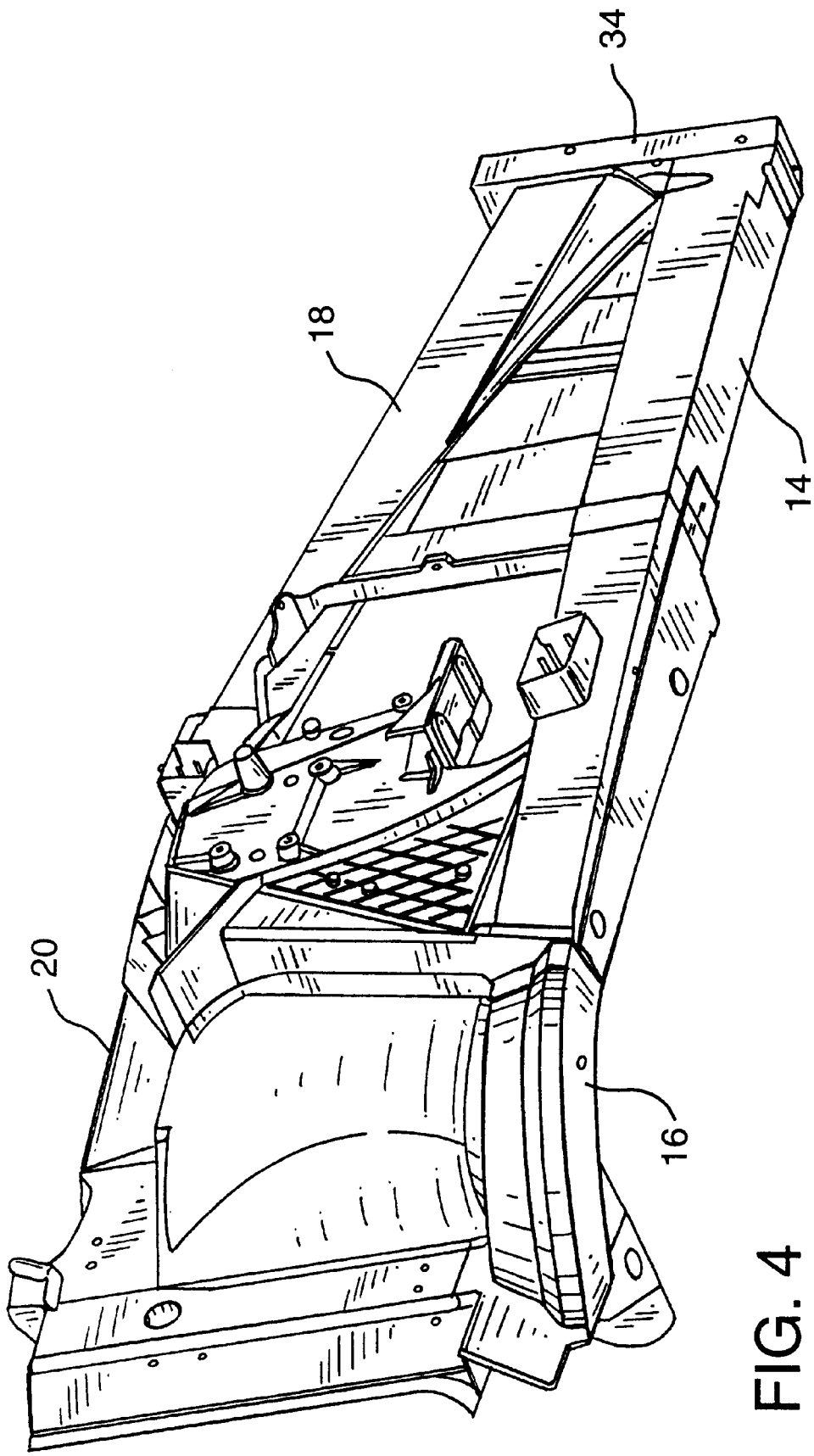
FIG. 4 is an isometric view showing the reverse side of the front frame portion of FIG. 2.

The front strut towers 10, 12 will generally be the mirror image of each other and the rear strut towers 50, 52 will generally be the mirror image of each other. Referring to FIGS. 2 through 4 the beams 14, 16, which are secured to the lower portion of strut tower 12, and 18, 20 which are secured to the upper portion thereof, may be secured thereto by any suitable means such as welding, adhesive bonding, or mechanical fasteners, for example, so as to create a rigid assembly.

FIGS. 2 and 3 show the outer face of front strut tower 12 which is a unitary casting. The upper suspension arm may be secured to threaded bores 90, 92, 94, 96 by any suitable mechanical fasteners and the lower suspension arms may be secured to threaded bores 100, 102, 104, 106 by suitable mechanical fasteners. The shock absorbers may be secured to both the front and rear strut towers 10, 12, 50, 52 and may be attached by suitable mechanical fasteners to apertured plates 110, 112. It will be appreciated that in this manner components of the vehicle may be effectively secured to the unitary cast strut towers in an efficient manner which preserves the structural integrity and efficiency of performance. The steering rack may be secured to threaded apertures 120, 122. It will be appreciated that additional items can be secured to the strut towers 10, 12, if desired. In the form shown, the base 130 and the top 132 will have an average depth of about 50 to 80 mm. The top 132 will generally have a smaller width than the base 130. The overall height H and overall width of the strut tower 12, which may be reduced from that of prior art systems wherein a plurality of components need to be assembled, may be about 300 to 600 mm.

As shown in FIG. 3, the towers preferably having a plurality of openings, such as 127, 129 in base 130, which serve as assembly master points and can also serve subsequently as assembly line clamping holes. Such principal location points will generally be provided on both front and rear strut towers 10, 12, 50, 52 at locations desired for the particular vehicle.

Figure 5:
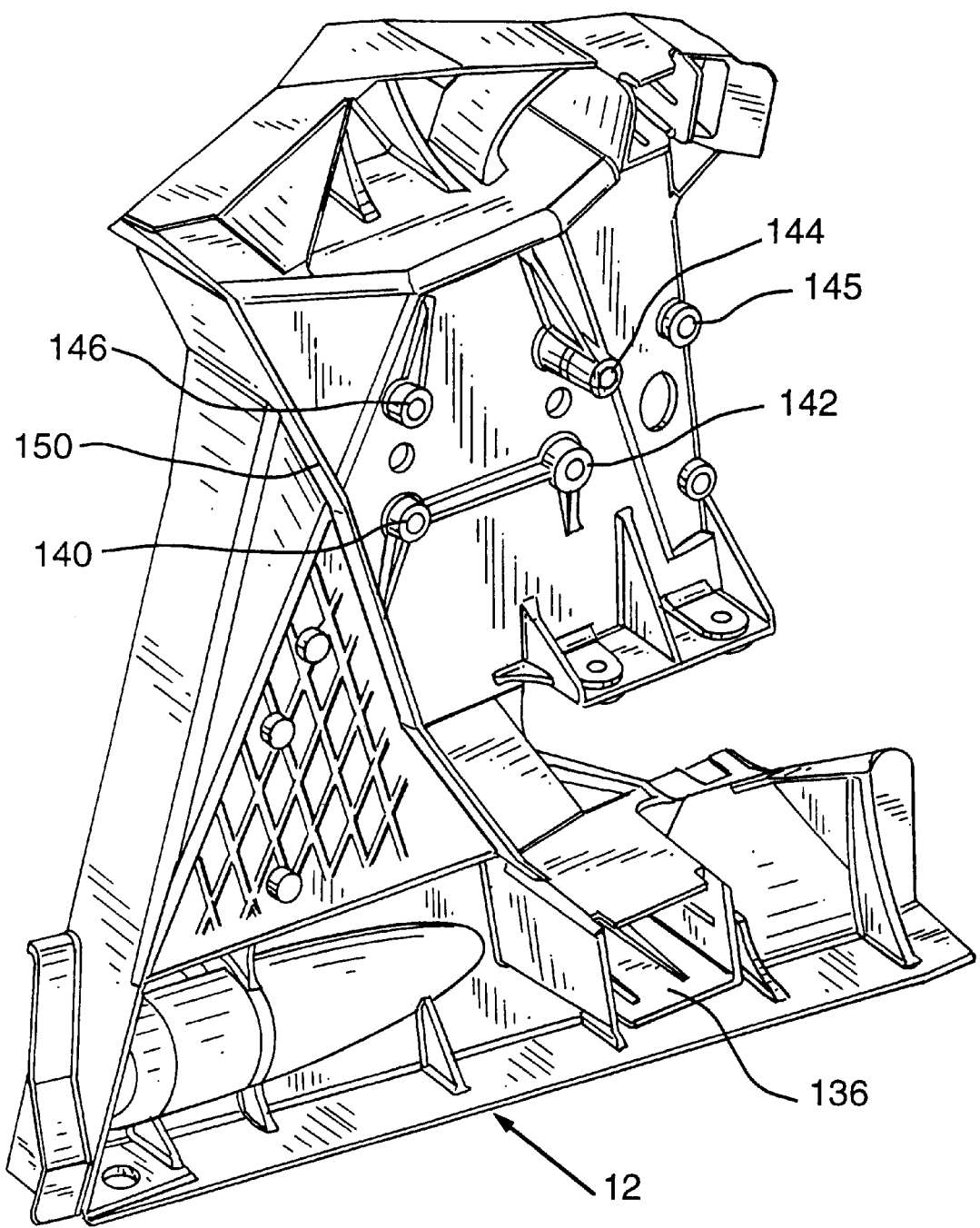
FIG. 5 is an isometric view showing the reverse side of the strut tower of FIG. 3.

Referring to FIG. 5, the inner face of the strut tower 12 is illustrated. A structural cross member (not shown) may be secured within passageway 136 by welding, adhesive bonding, or mechanical fasteners, for example. Secondary bracket items such as threaded apertures 140, 142, 144, 146 may be employed to secure other items such as a horn or a braking system component, for example. Flange 150 is adapted to be secured to the firewall.

Figure 6:
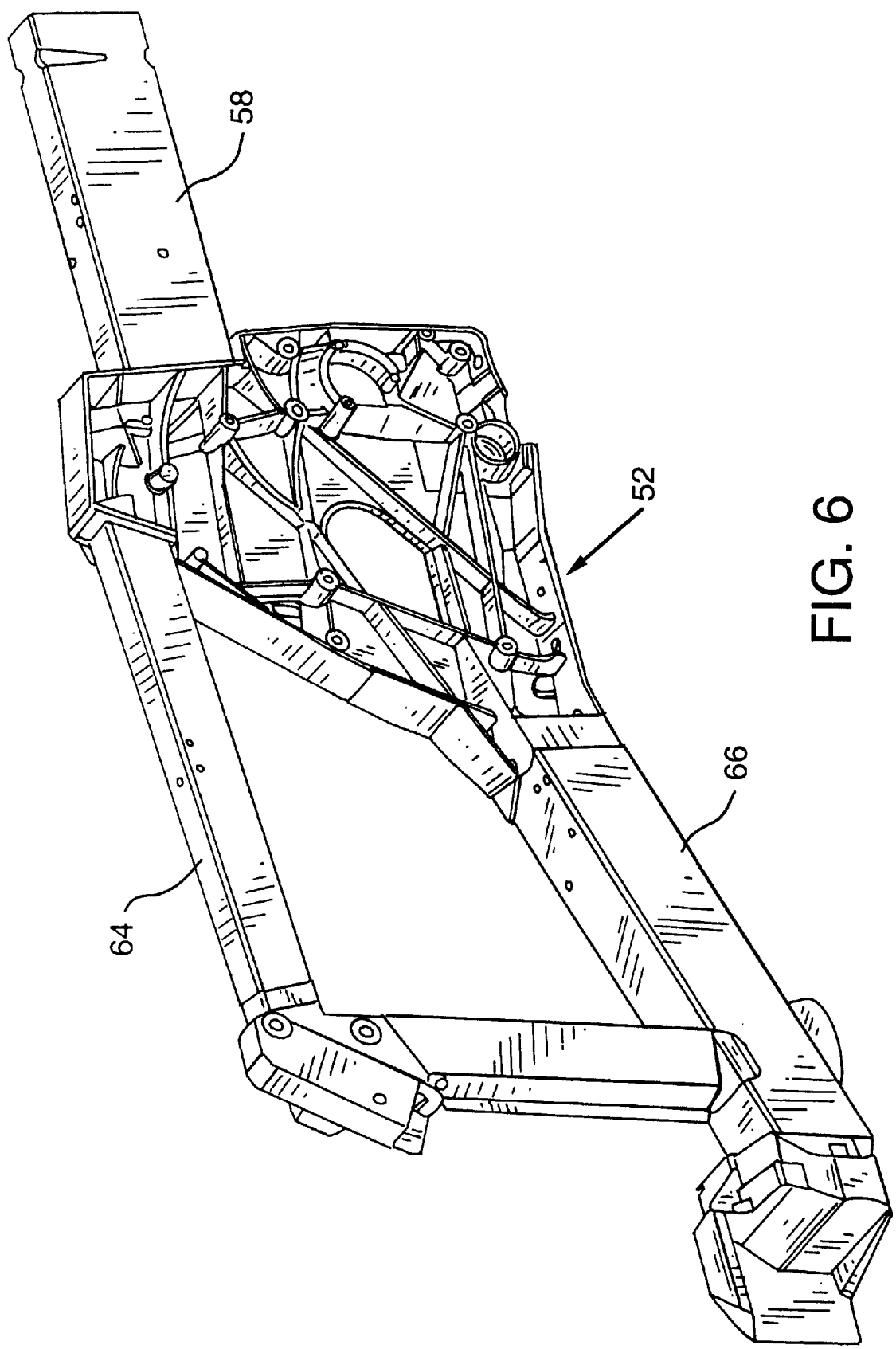
FIG. 6 is an isometric view of the left side of a rear frame portion of the frame of FIG. 1.
Figure 7:
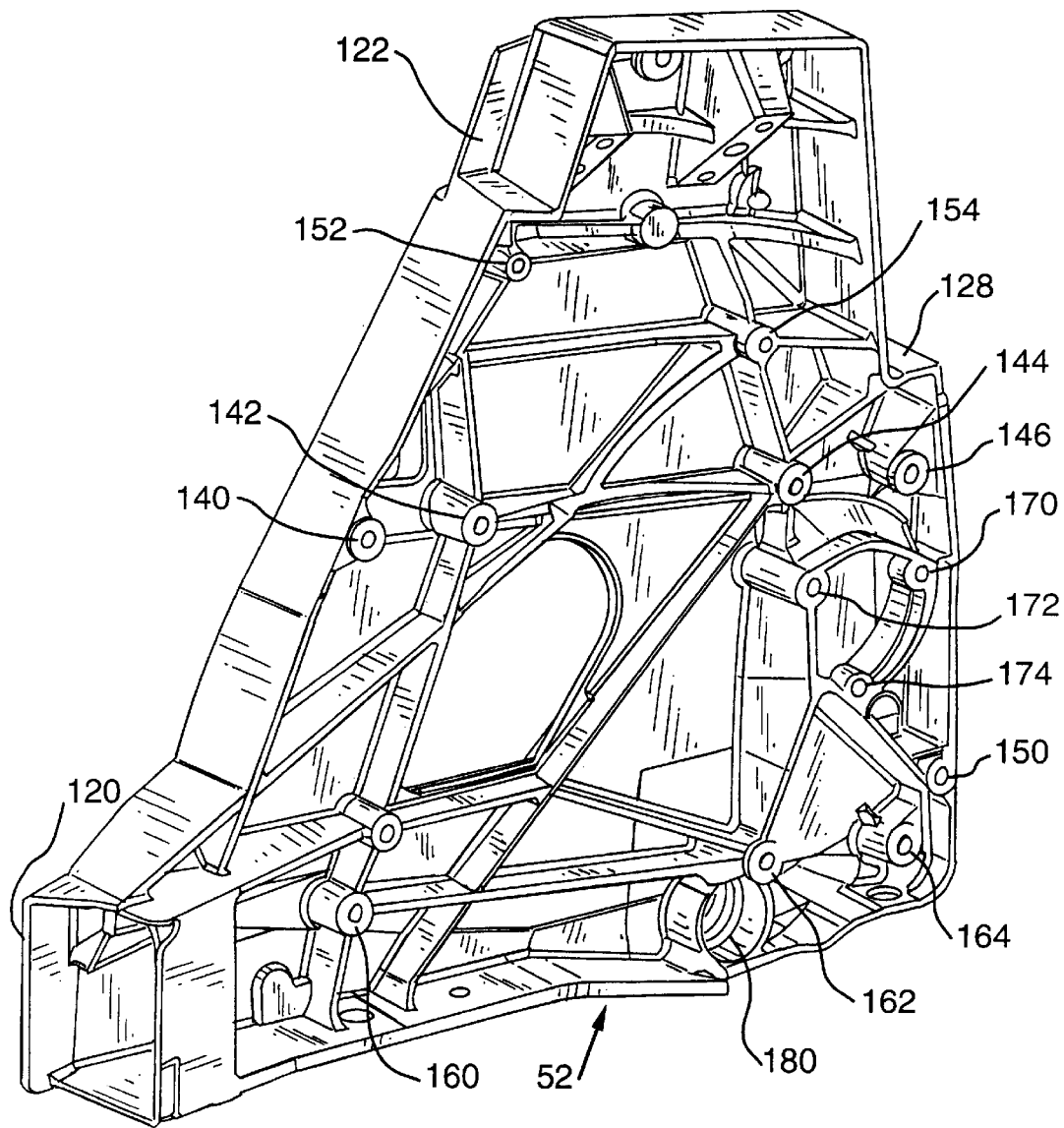
FIG. 7 is an isometric view of the strut tower of FIG. 6 showing the outside thereof.

Referring now to FIGS. 6 and 7, the left-hand rear strut tower 52 will be considered in greater detail. The structural beam 66 is secured within generally square joining element 120. Beam 64 (not shown) is received within recess 122 and beam 58 is secured at support recess 128. These beams may be connected to the strut towers by welding, for example. Threaded bores 140, 142, 144, 146 may be employed to secure the upper suspension arm and threaded bores 160, 162, 164 may be employed to secure the lower suspension arm as by mechanical fasteners, for examples. Wheelhouse attachment may be effected by suitable mechanical fasteners secured to threaded bores 150, 152, 154. The tie-rod attachment may be effected at threaded bores 170, 172, 174. An anti-roll bar may be secured to passageway 180. It will be appreciated by those skilled in the art that other items may be secured to the strut towers. For example, the hood hinges, hand brake bracket, and steering rack support may be secured to the front strut towers 10, 12. The back door, trunk lid or window hinges may be secured to the rear struts 50, 52. Electric motors may also be secured to the strut towers.

Figure 8:
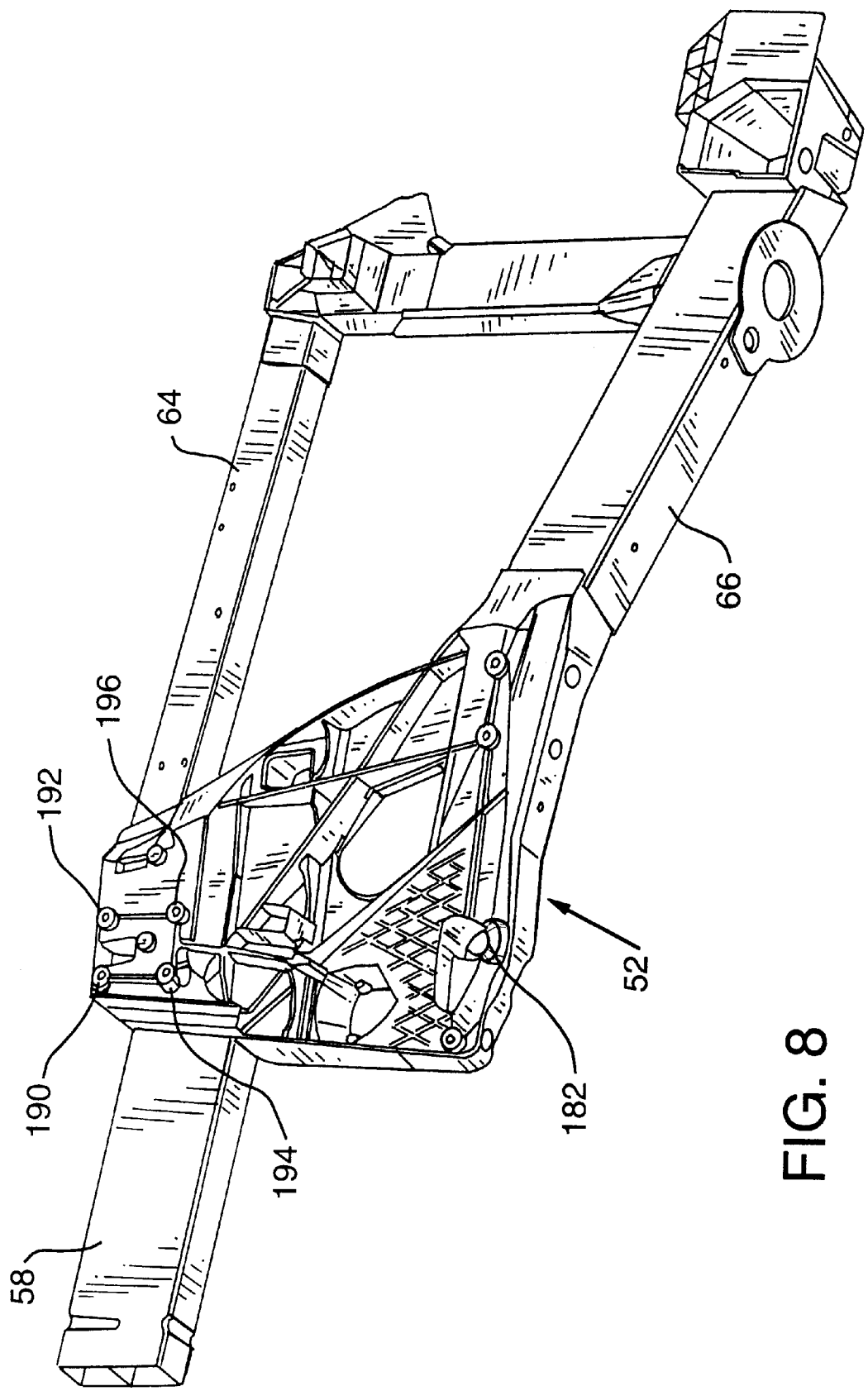
FIG. 8 is an isometric view of the reverse side of the rear frame portion of FIG. 6.
Figure 9:
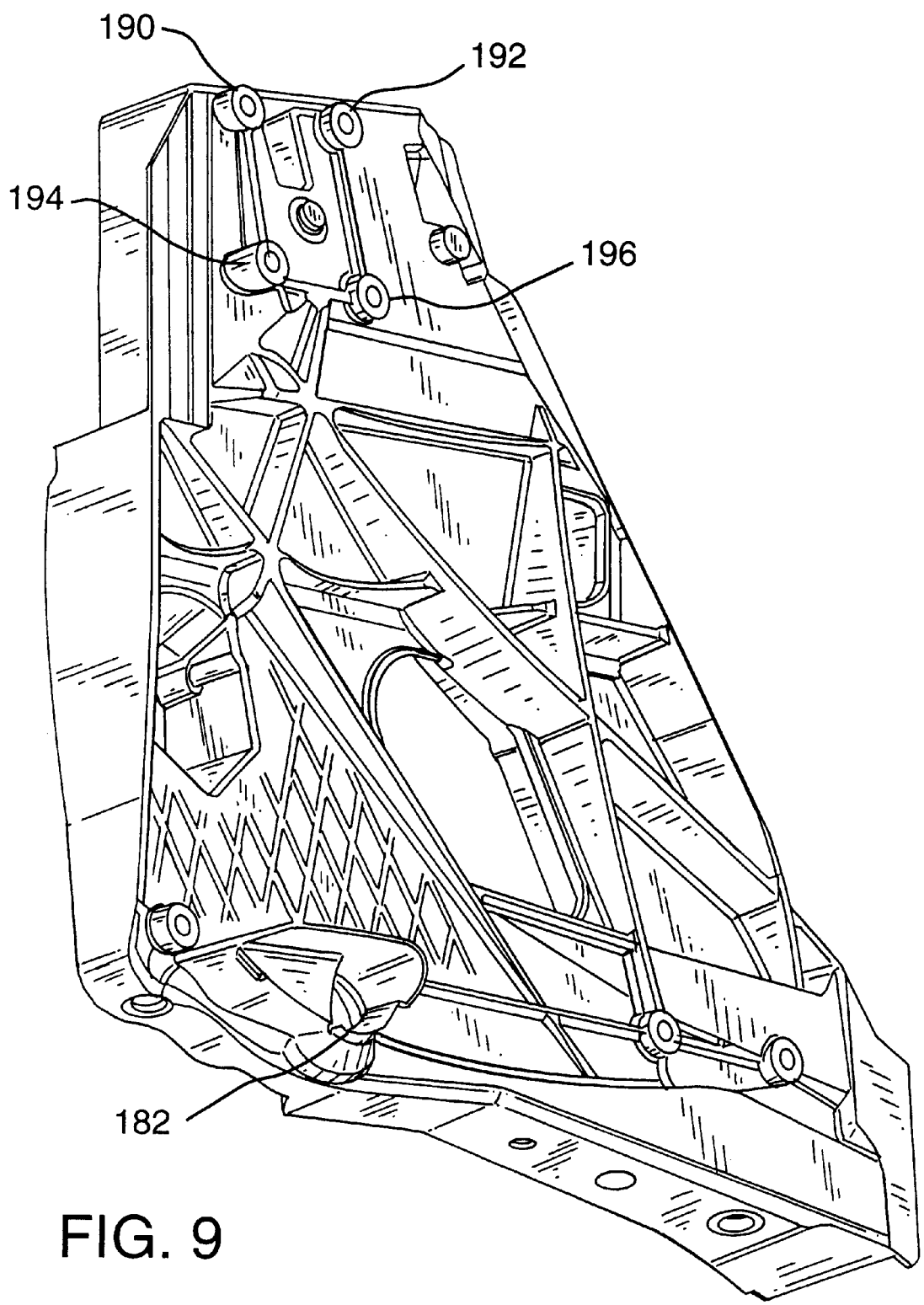
FIG. 9 is an isometric view showing the reverse side of a strut tower of FIG. 7.

Referring to FIG. 8, the cross member which may be secured to bore 180 may have its other end secured at 182. A structural frame cross-over member may be secured within threaded bores 190, 192, 194, 196, if desired.

It will generally be preferred to make the strut towers 10, 12, 50, 52 out of an aluminum casting which may, for example, be a sand casting or a die casting. A suitable alloy for sandcastings would be A356 or B356 with such an approach being beneficial for low volume production of high strength parts. For larger volume production die casting, an alloy such as C448 may be employed. By reference herein to "aluminum" it will be appreciated that any suitable casting alloys having the properties desired for the end use application may be employed. Also, magnesium and magnesium alloy castings may be employed to make the strut towers, if desired.

It will be appreciated that the present invention provides an effective means of simply and economically employing strut towers which are unitary castings and may be employed beneficially in a vehicular frame, which may be a spaceframe, while preserving the desired functional aspects of the frame. All of this is accomplished while eliminating the need to manufacture a large number of separate parts and invest in the labor required to assemble such parts.

Whereas particular embodiments of the invention have been described above for purposes of illustration, it will be evident to those skilled in the art that numerous variations of the details may be made without departing from the invention as to defined in the appended claims.

We claim:

1. An automotive vehicle frame comprising:
   a front frame portion, a rear frame portion, and an intermediate frame portion connecting said front frame portion with said rear frame portion.
   said front frame portion having a pair of relatively spaced front strut towers,
   said rear frame portion having a pair of relatively spaced rear strut towers,
   each said front strut tower and each said rear strut tower having a plurality of frame components connected thereto,
   each said front strut tower and each said rear strut tower connected to vehicle suspension means,
   at least two said strut towers connected to vehicle shock absorber means,
   said frame being a unitary metal casting,
   said frame components being elongated beams, and
   said front strut towers having a pair of said beams secured to an upper portion thereof and a pair of said beams secured to a lower portion thereof.

2. The automotive vehicle frame of claim 1 including
   said vehicle suspension means connected to said strut towers having an upper suspension arm secured to a first part of said strut towers and a second suspension arm secured to an underlying second part of said strut towers.

3. The automotive vehicle frame of claim 2 including
   said front strut towers having vehicle steering means connected thereto.

4. The automotive vehicle frame of claim 1 including
   said strut towers being disposed on the sides of said vehicle frame.

5. The automotive vehicle frame of claim 1 including
   said rear strut towers each having a plurality of beams secured thereto.

6. The automotive vehicle frame of claim 5 including
   said beams being secured to said strut towers by at least one means selected from the group consisting of welding, mechanical fasteners and adhesive bonding.

7. The automotive vehicle frame of claim 1 including said vehicle frame being a spaceframe.

8. The automotive vehicle frame of claim 1 including said suspension means being secured to said strut towers by mechanical fasteners.

9. The automotive vehicle frame of claim 1 including said strut towers having a wider base than top.

10. The automotive vehicle frame of claim 1 including said rear strut towers each being generally a mirror image of the other.

11. The automotive vehicle frame of claim 10 including each said front strut tower each being generally a mirror image of the other.

12. The automotive vehicle frame of claim 1 including elongated beams connecting said rear strut towers to each other.

13. The automotive vehicle frame of claim 1 including elongated beams connecting said front strut towers to each other.

14. The automotive vehicle frame of claim 1 including said strut towers being made of cast aluminum.

15. The automotive vehicle frame of claim 14 including said strut towers being substantially rigid.

16. The automotive vehicle frame of claim 1 including said strut towers being made of cast magnesium.

17. The automotive vehicle frame of claim 1 including said strut towers having an average depth of about 50 to 80 mm and an overall height of about 300 to 600 mm.

18. The automotive vehicle frame of claim 17 including said strut towers having an overall width of about 300 to 600 mm.

* * * * *

UNITED STATES PATENT AND TRADEMARK OFFICE
CERTIFICATE OF CORRECTION

PATENT NO. : 6,193,273 B1
DATED : February 27, 2001
INVENTOR(S) : Novak et al.

It is certified that error appears in the above-identified patent and that said Letters Patent is hereby corrected as shown below:

<u>Column 4,</u>
Lines 27-46, claim 1 should read:
1. An automotive vehicle frame comprising:
    a front frame portion, a rear frame portion, and an intermediate frame portion connecting said front frame portion with said rear frame portion,
    said front frame portion having a pair of relatively spaced front strut towers,
    said rear frame portion having a pair of relatively spaced rear strut towers,
    each said front strut tower and each said rear strut tower having a plurality of frame components connected thereto,
    each said front strut tower and each said rear strut tower connected to vehicle suspension means,
    at least two said strut towers connected to vehicle shock absorber means,
    the front and rear strut tower each being a unitary metal casting,
    said frame components being elongated beams, and
    said front strut towers having a pair of said beams secured to an upper portion thereof and a pair of said beams secured to a lower portion thereof.

Signed and Sealed this

Twenty-first Day of February, 2006

JON W. DUDAS
*Director of the United States Patent and Trademark Office*